(12) United States Patent
Ainsworth et al.

(10) Patent No.: US 11,126,014 B2
(45) Date of Patent: Sep. 21, 2021

(54) EYEWEAR, EYEWEAR SYSTEMS AND ASSOCIATED METHODS FOR ENHANCING VISION

(71) Applicants: Sean Ainsworth, Northville, MI (US); Peter Francis, Portland, OR (US); Thomas J. Rea, Gregory, MI (US)

(72) Inventors: Sean Ainsworth, Northville, MI (US); Peter Francis, Portland, OR (US); Thomas J. Rea, Gregory, MI (US)

(73) Assignee: Regener-Eyes, LLC, Hernando, FL (US)

( * ) Notice: Subject to any disclaimer, the term of this patent is extended or adjusted under 35 U.S.C. 154(b) by 0 days.

(21) Appl. No.: 16/591,154

(22) Filed: Oct. 2, 2019

(65) Prior Publication Data
US 2020/0033640 A1 Jan. 30, 2020

Related U.S. Application Data

(63) Continuation of application No. 15/686,894, filed on Aug. 25, 2017, now Pat. No. 10,437,080, which is a
(Continued)

(51) Int. Cl.
*G02B 27/01* (2006.01)
*G02C 11/00* (2006.01)
*G02C 5/14* (2006.01)

(52) U.S. Cl.
CPC ............ *G02C 11/10* (2013.01); *G02B 27/017* (2013.01); *G02B 27/0172* (2013.01);
(Continued)

(58) Field of Classification Search
CPC ........ G02C 5/146; G02C 11/10; G02C 11/00; G02B 27/017; G02B 27/0172;
(Continued)

(56) References Cited

U.S. PATENT DOCUMENTS 5,151,722 A 9/1992 Massof et al.
5,886,735 A 3/1999 Bullister
(Continued)

OTHER PUBLICATIONS

SimplyEyeGlasses.com (http://www.simplyeyeglasses.com/information/frame_size.php, Way Back Machine internet archive, Jul. 14, 2011) (Year: 2011) (Year: 2011).*
(Continued)

*Primary Examiner* — William R Alexander
(74) *Attorney, Agent, or Firm* — Mintz Levin Cohn Ferris Glovsky and Popeo, P.C.

(57) ABSTRACT

Embodiments according to the present disclosure are directed to, for example, head mounted eyewear (e.g., similar in form to traditional eye glasses) that includes low light vision enhancing and/or additional vision enhancing capabilities (e.g., near-vision enhancing capabilities). For example, in some embodiments, a head mounted housing arrangement is provided that includes an eyepiece adjacent to a wearer's eye, one or more imaging devices (e.g., one or more solid state or other imagers sensitive to light, including low light levels), one or more image generator(s) operatively coupled to the imager(s) (e.g., optically coupled, in electrical communication with, or wirelessly coupled) to receive an output from the imaging device(s), and/or one or more optical elements (e.g., a combination of mirror(s) and/or lenses). The one or more optical elements may place an output of the image generator(s) into a position that is visible to the wearer's eye.

16 Claims, 15 Drawing Sheets

Related U.S. Application Data continuation of application No. 14/150,347, filed on Jan. 8, 2014, now Pat. No. 9,759,932.

(60) Provisional application No. 61/750,189, filed on Jan. 8, 2013.

(52) U.S. Cl.
CPC ......... *G02B 27/0176* (2013.01); *G02C 5/146* (2013.01); *G02C 11/00* (2013.01); *G02B 2027/0138* (2013.01); *G02B 2027/0178* (2013.01)

(58) Field of Classification Search
CPC ........ G02B 27/0176; G02B 2027/0138; G02B 2027/0178
USPC .......................................................... 351/158
See application file for complete search history.

(56) References Cited

U.S. PATENT DOCUMENTS

| | | | |
|---|---|---|---|
| 6,011,653 | A | 1/2000 | Karasawa |
| 6,091,546 | A | 7/2000 | Spitzer |
| 6,462,871 | B1 | 10/2002 | Morishima |
| 6,483,647 | B2 | 11/2002 | Zadravec |
| 6,522,474 | B2 | 2/2003 | Cobb et al. |
| 7,806,525 | B2 * | 10/2010 | Howell ................. G02C 11/10 351/158 |
| 8,004,769 | B2 | 8/2011 | Spaller |
| 9,759,932 | B1 | 9/2017 | Ainsworth et al. |
| 10,437,080 | B2 | 10/2019 | Ainsworth et al. |
| 2005/0239502 | A1 * | 10/2005 | Swab ................... G02C 5/146 455/556.1 |
| 2007/0030442 | A1 * | 2/2007 | Howell ................. G02C 11/10 351/158 |
| 2007/0285752 | A1 | 12/2007 | Ouchi |
| 2008/0169998 | A1 | 7/2008 | Jacobsen et al. |
| 2008/0211921 | A1 | 9/2008 | Sako et al. |
| 2008/0266669 | A1 | 10/2008 | Durner et al. |
| 2009/0303315 | A1 | 12/2009 | Charlesworth |
| 2010/0220176 | A1 | 9/2010 | Ziemeck et al. |
| 2010/0226017 | A1 | 9/2010 | Spaller |
| 2010/0283956 | A1 * | 11/2010 | Jackson ................. A61F 9/023 351/49 |
| 2011/0043436 | A1 | 2/2011 | Yamamoto |
| 2011/0213664 | A1 | 9/2011 | Osterhout et al. |
| 2011/0267690 | A1 | 11/2011 | Spaller |
| 2012/0068913 | A1 | 3/2012 | Bar-zeev et al. |
| 2012/0200595 | A1 * | 8/2012 | Lewis .................... G06Q 50/22 345/619 |
| 2012/0306940 | A1 | 12/2012 | Machida et al. |
| 2012/0327275 | A1 * | 12/2012 | Ikeda ................ H04N 5/23219 348/240.2 |
| 2013/0050432 | A1 | 2/2013 | Perez et al. |
| 2013/0215374 | A1 | 8/2013 | Blum et al. |
| 2013/0242392 | A1 | 9/2013 | Wang et al. |
| 2015/0009309 | A1 * | 1/2015 | Heinrich ............. G02B 27/017 348/61 |
| 2015/0150725 | A1 * | 6/2015 | Piombini ........... G02B 27/0172 2/12 |
| 2017/0351120 | A1 | 12/2017 | Ainsworth et al. |

OTHER PUBLICATIONS

Frame Size (Jul. 14, 2011), SimplyEyeGlasses.com, Retrieved from https://www.simplyeyeglasses.com/information/frame-size.php, 3 pages.

Mini-Projector for Smartphones (May 2, 2012), Fraunhofer, Available at <https://www.fraunhofer.de/en/press/research-news/2012/may/mini-projector-for-smartphones.html>, 2 pages.

MVIEW Microprojector (2011), Lemoptix, Available at <www.lemoptix.com/technology/products/mviewmicroprojector>, 1 page.

* cited by examiner

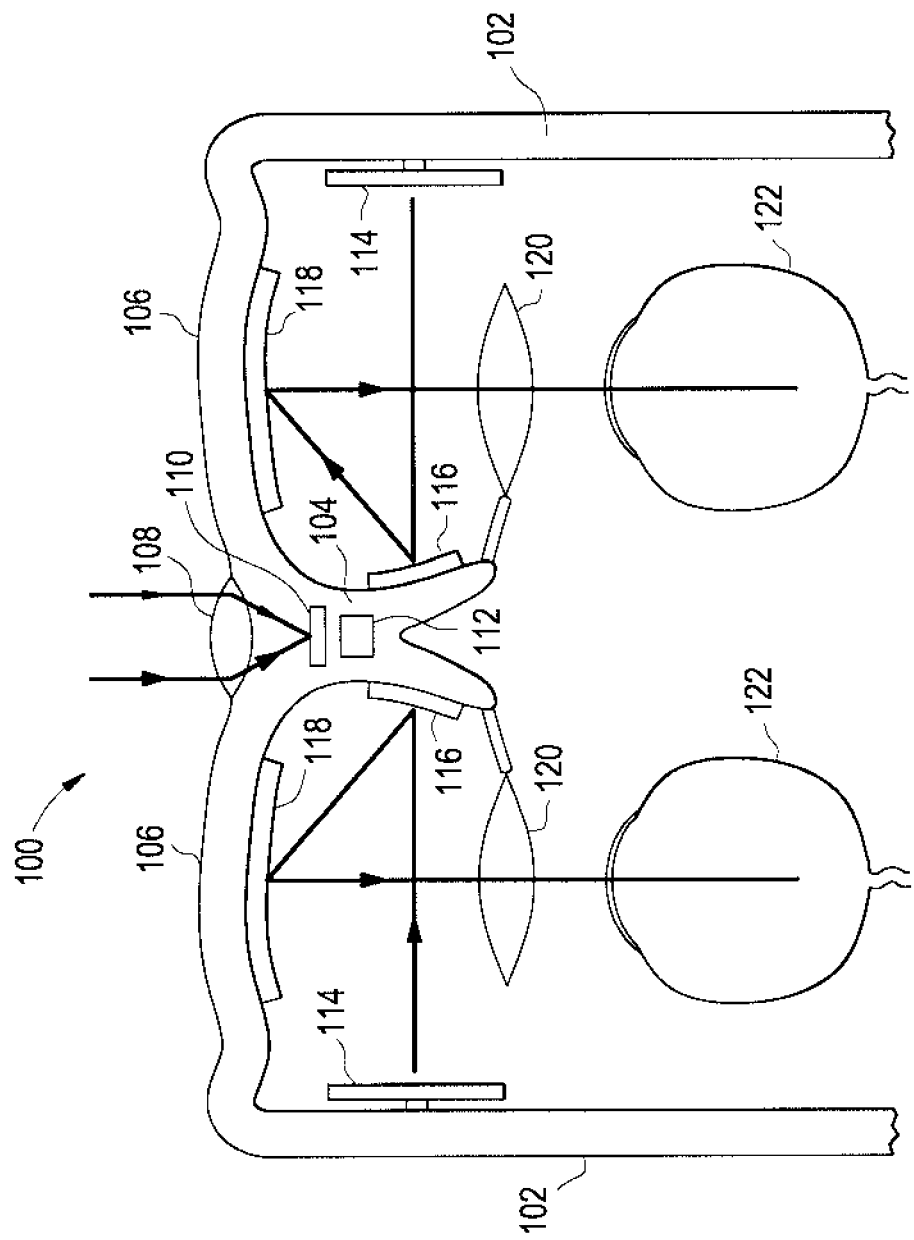

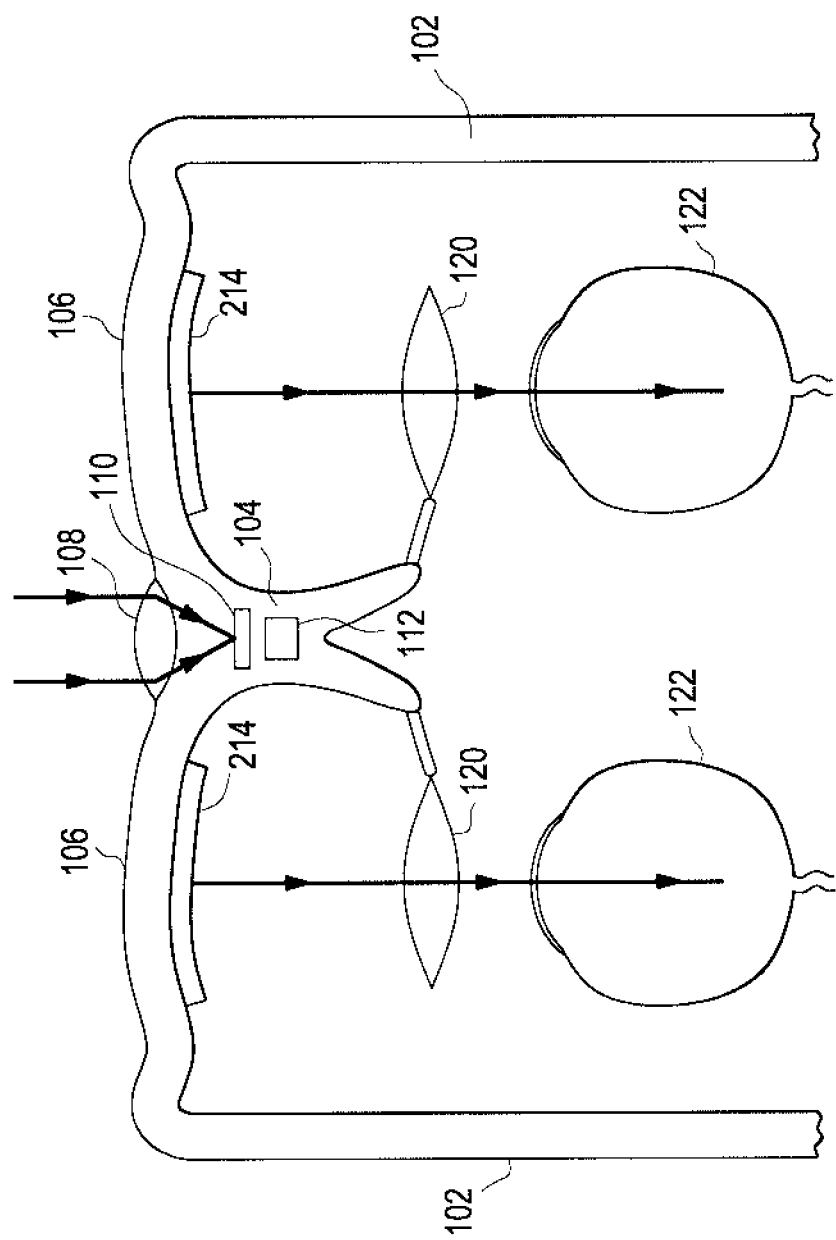

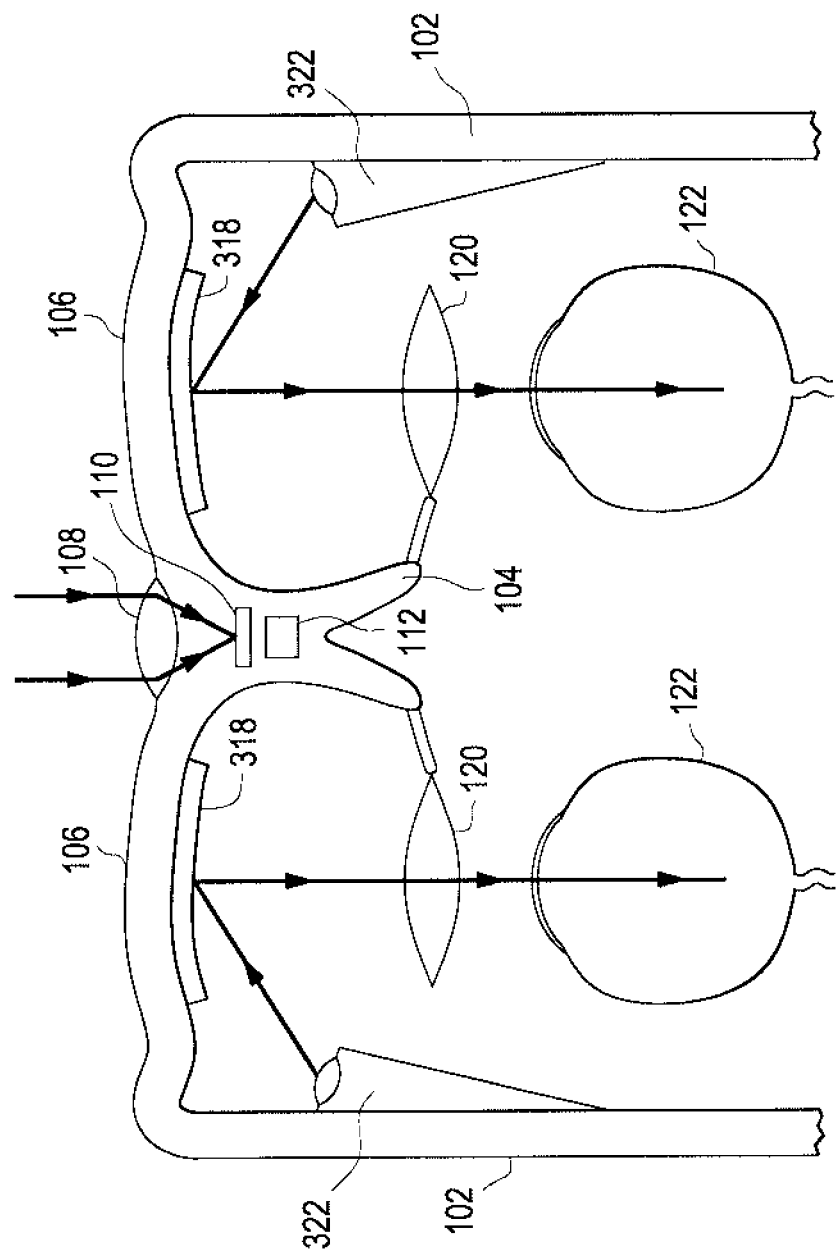

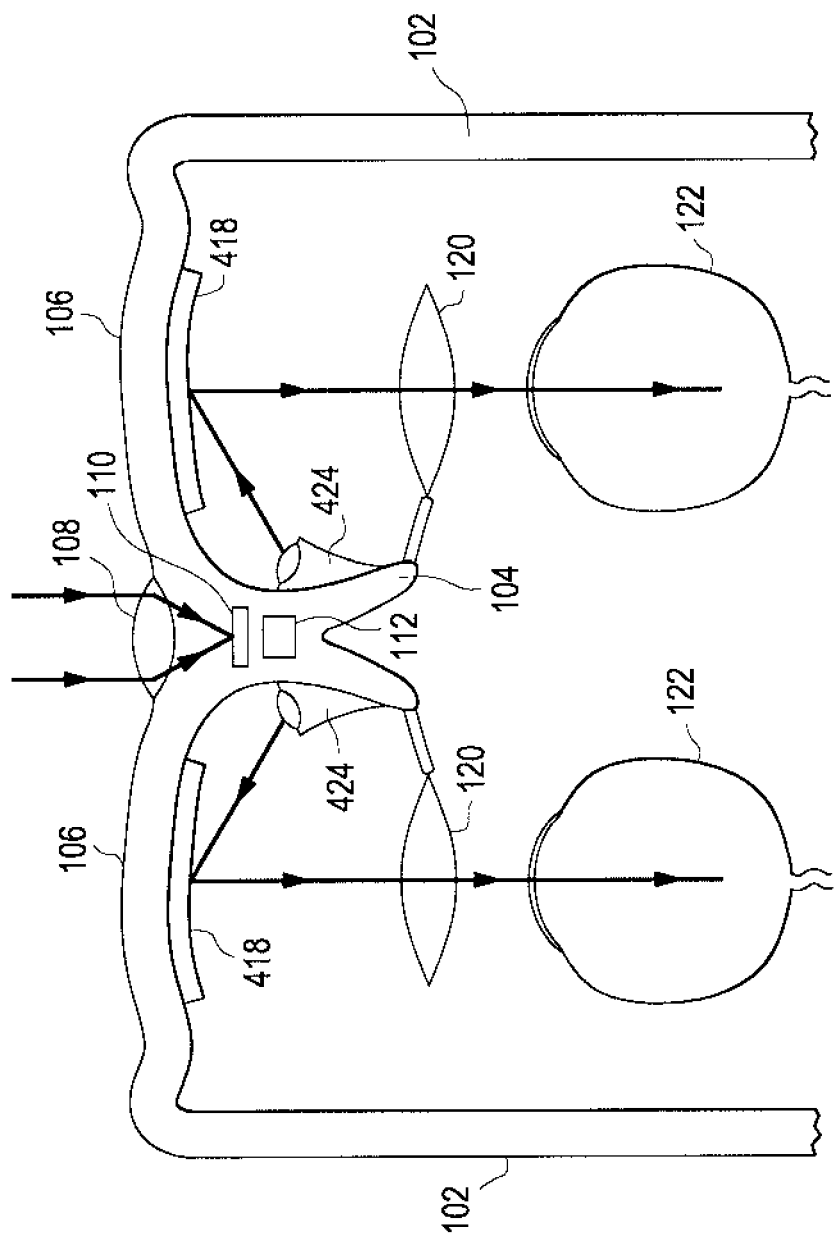

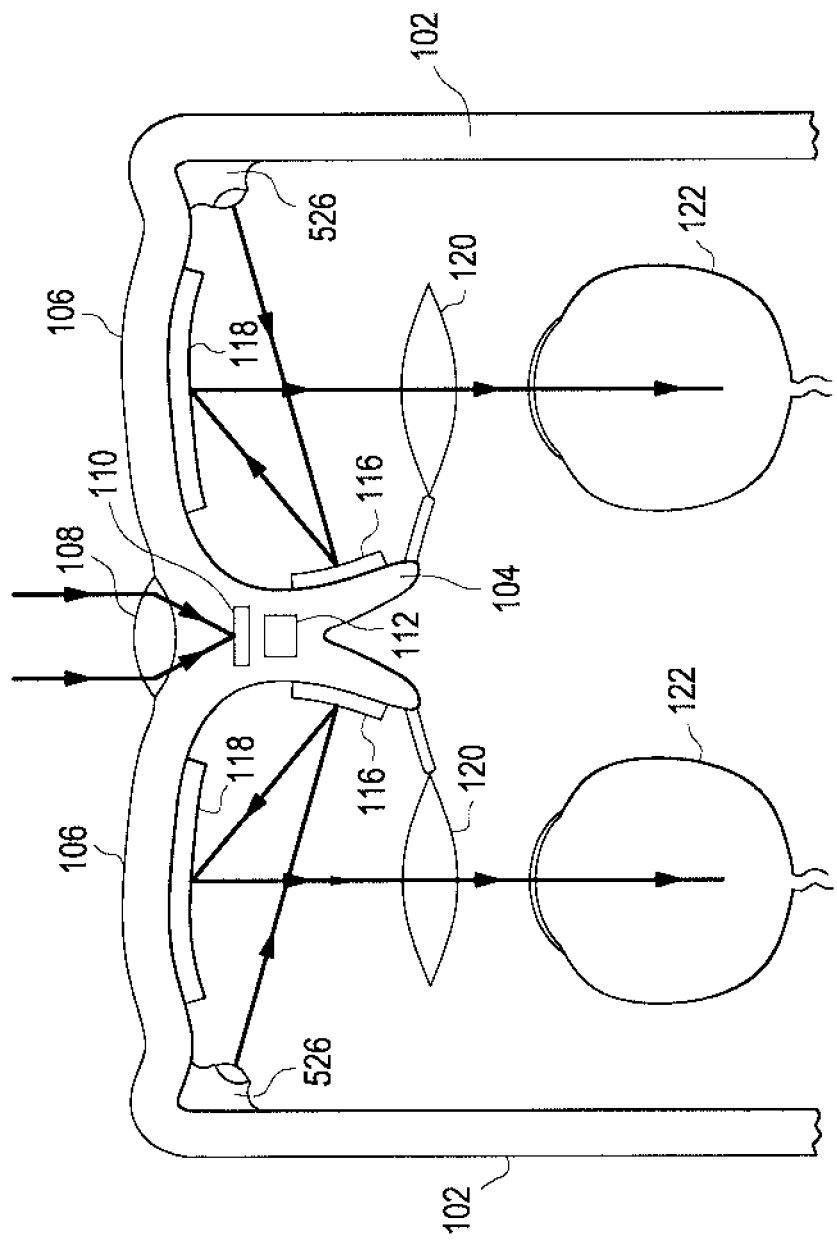

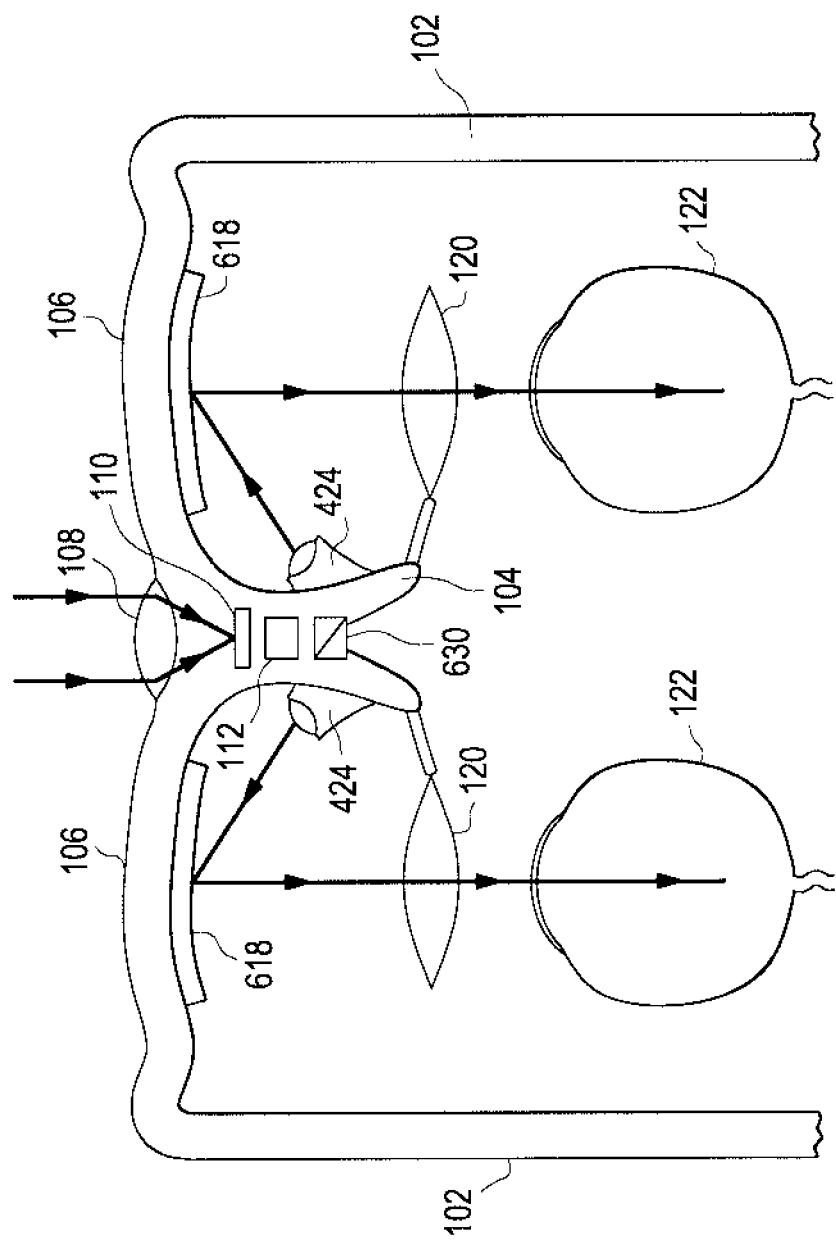

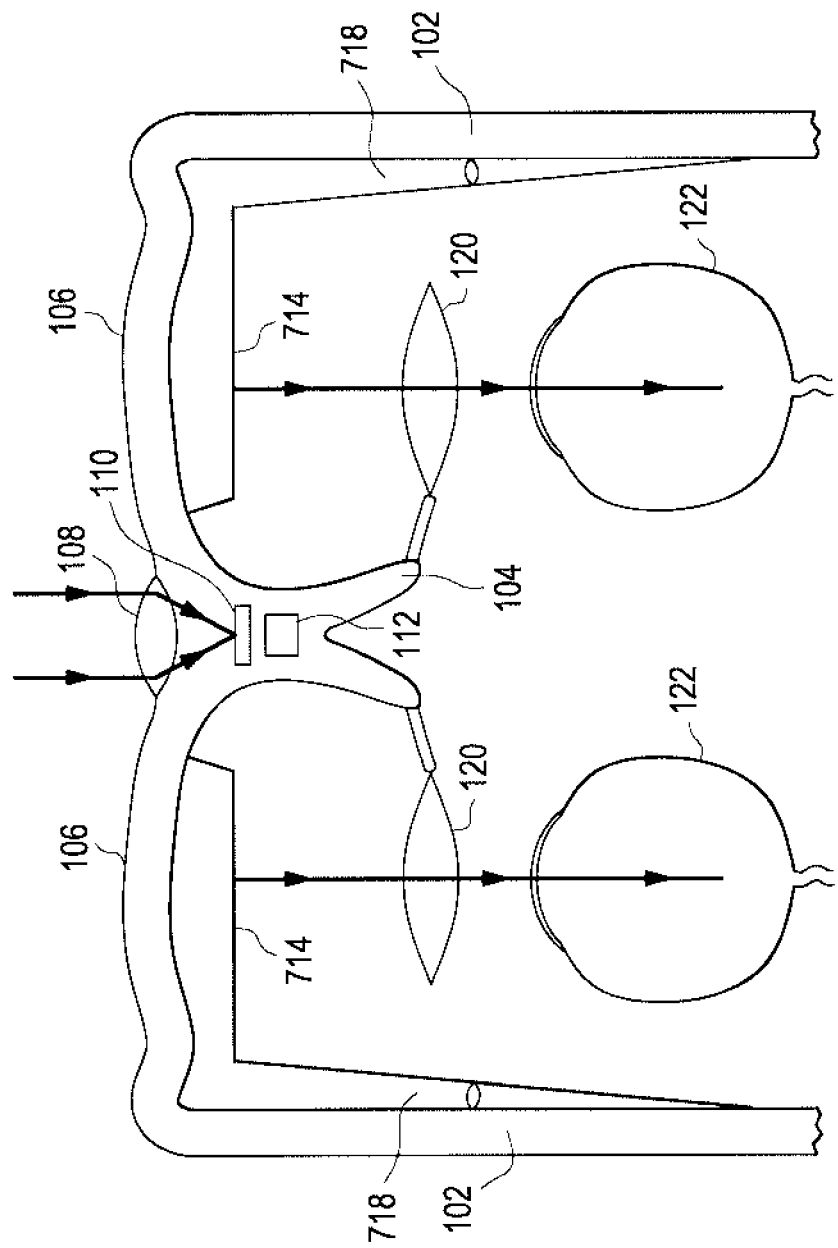

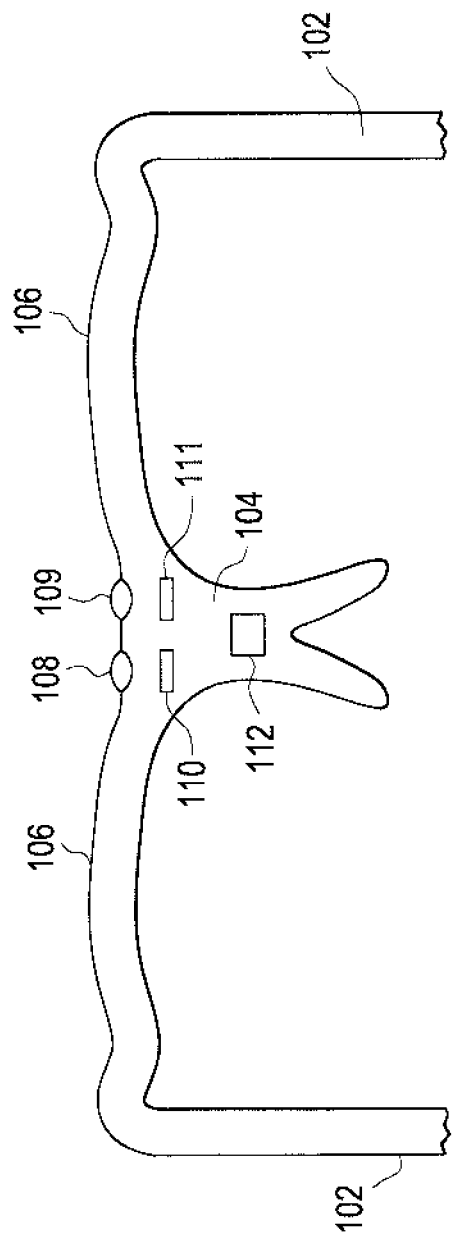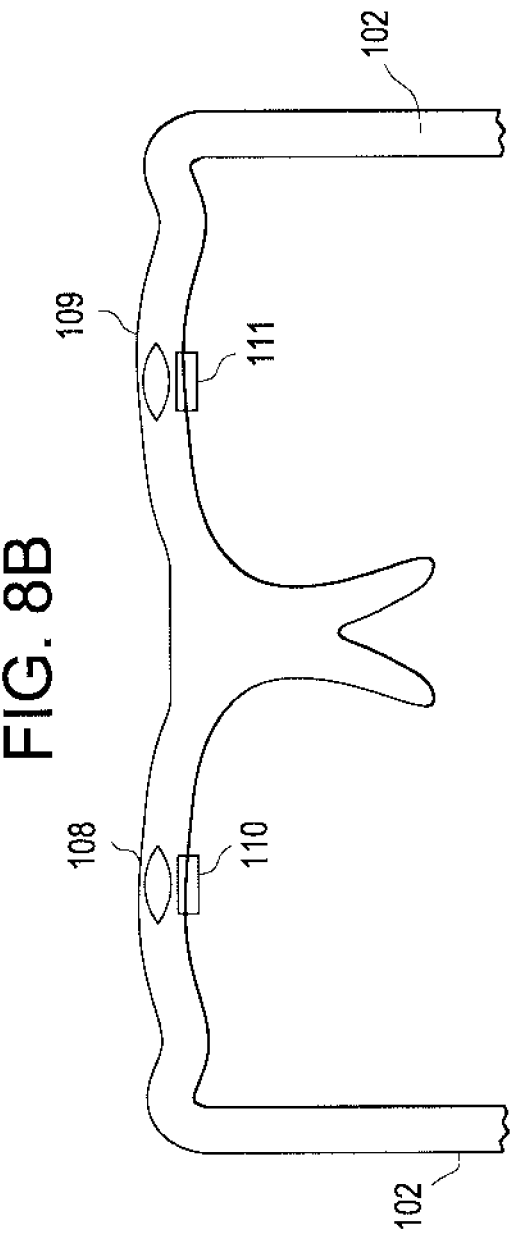

EYEWEAR, EYEWEAR SYSTEMS AND ASSOCIATED METHODS FOR ENHANCING VISION

RELATED APPLICATIONS

The present application claims priority to and is a continuation of U.S. patent application Ser. No. 15/686,894 to Ainsworth et al., filed Aug. 25, 2017, now U.S. Pat. No. 10,437,080, issued Oct. 8, 2019, and entitled "Eyewear, Eyewear Systems and Associated Methods for Enhancing Vision", which is a continuation of U.S. patent application Ser. No. 14/150,347 to Ainsworth et al., filed Jan. 8, 2014, now U.S. Pat. No. 9,759,932, issued Sep. 12, 2017, and entitled "Eyewear, Eyewear Systems and Associated Methods for Enhancing Vision", which claims priority to and benefit under 35 U.S.C. § 119(e) of U.S. Provisional Patent Application No. 61/750,189 to Ainsworth et al., filed Jan. 8, 2013, and entitled "Eyewear And Associated Methods For Enhancing Vision," and incorporates their disclosures herein by reference in their entireties.

FIELD OF THE PRESENT DISCLOSURE

Embodiments of the present disclosure are directed to eyewear for enhancing human vision.

SUMMARY OF SOME OF THE EMBODIMENTS

In some embodiments, head mounted eyewear (e.g., similar in form to traditional eye glasses) is provided that includes low light vision enhancing and/or additional vision enhancing capabilities (e.g., near-vision enhancing capabilities). For example, in some embodiments, a head mounted housing arrangement is provided that includes an eyepiece adjacent to a wearer's eye, one or more imaging devices (e.g., one or more solid state or other imagers sensitive to light, including low light levels), one or more image generator(s) operatively coupled to the imager(s) (e.g., optically coupled, in electrical communication with, or wirelessly coupled) to receive an output from the imaging device(s), and/or one or more optical elements (e.g., a combination of mirror(s) and/or lenses). The one or more optical elements may place an output of the image generator(s) into a position that is visible to the wearer's eye.

In some embodiments, an eyewear system is provided which may comprise a frame, and one or more components integrated with the frame, the components selected from the group consisting of: a digital camera, a microprocessor, a micro-display, projection optics, and optical prescription lenses. In such embodiments, the system may further comprise at least one of a battery, one or more electrical connectors, and wireless communication means.

Embodiments may also include a wireless remote control, where the wireless remote control is configured to control one or more functions of at least one of the components. Such functions may comprise at least one of on/off, one or more display modes, digital magnification, contrast stretch, low light level signal amplification, and dynamic range alteration of one or both eyes.

In some embodiments, an eyewear system is provided which may include at least one sidearm (and in some embodiments, two), a nose piece, at least one eyepiece (and in some embodiments, two), one or more optical elements, one or more imaging devices, and one or more image generators coupled to the one or more imaging devices.

In some embodiments, an eyewear system is provided which comprises a traditional pair of eyeglasses comprising a frame, optionally two side arms, corresponding lenses, and a nose piece, configured with low light vision enhancing means and/or additional vision enhancing means. The eyeglasses are configured such that the eyeglasses do not protrude further than about 40 to about 90 mm from the bridge of the wearer's nose, from the top of the lens to the bottom of each lens is between about 15 to about 100 mm, the distance between the lenses is between about 1 to about 25 mm, and a respective arm is between about 100 and 180 mm in length.

These and many other embodiments, objects and advantages of the present disclosure will be even more apparent with reference to the attached drawings and corresponding detailed description which follows. Immediately below are brief descriptions of the drawings.

BRIEF DESCRIPTION OF THE DRAWINGS

FIG. 1 is a diagram of vision enhancing eyewear in accordance with one embodiment of the present disclosure.

FIG. 2 is a diagram of vision enhancing eyewear in accordance with another embodiment of the present disclosure.

FIG. 3 is a diagram of vision enhancing eyewear in accordance with yet another embodiment of the present disclosure.

FIG. 4 is a diagram of vision enhancing eyewear in accordance with another embodiment of the present disclosure.

FIG. 5 is a diagram of vision enhancing eyewear in accordance with still another embodiment of the present disclosure.

FIG. 6 is a diagram showing another embodiment of vision enhancing eyewear according to the present disclosure.

FIG. 7 is a diagram of vision enhancing eyewear in accordance with still another embodiment of the present disclosure.

FIGS. 8A and 8B are diagrams of vision enhancing eyewear in accordance with yet other embodiments according to the present disclosure.

DETAILED DESCRIPTION OF SOME OF THE EMBODIMENTS

Figure 9A:
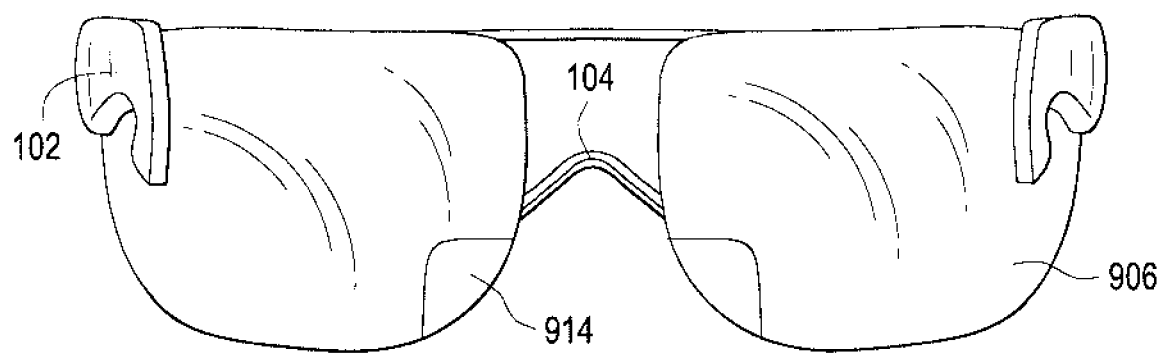
FIG. 9A is a front view of vision enhancing eyewear in accordance with yet other embodiment according to the present disclosure.

Accordingly, some embodiments of the present disclosure are directed to a low-profile, wearable apparatus that includes one or more (e.g., a plurality, and in some embodiments, all) of the following capabilities:
- low light vision enhancement
- wide dynamic range
- contrast enhancement
- digital zoom
- optical zoom
- dynamic range scaling In some embodiments, the general form of some of the embodiments disclosed herein may be similar to that of traditional eyewear (e.g., spectacles, sunglasses, or reading glasses), except that the apparatus may include low light vision enhancing and/or additional vision enhancing capabilities. In some embodiments, the profile of the apparatus may be minimized in terms of its size and shape, e.g., such that the apparatus appears similar to if not indistinguishable from traditional eyewear. This is generally in contrast to night-vision goggles and other existing, bulky low-light vision enhancing products.

For example, in some embodiments, the apparatus may be sized and configured such that, from the bridge of the wearer's nose, the apparatus does not protrude further than 3 inches, further than 2 inches, or further than 1 inch, from the bridge of the wearer's nose (e.g., the apparatus protruding between 1-2 inches or between 1-3 inches from the wearer's nose). In some embodiments, the apparatus may include two sidearms, which may be of the same or similar dimensions to the arms of traditional glasses.

According to some embodiments of the present disclosure, the dimensional ranges of the eyewear may be, by way of example, as follows (the manner of determining these measurements according to some embodiments of the present disclosure is illustrated in FIG. 12):

A measurement: (temple to the nose piece): 40-90 mm, or any values or ranges of values in between, e.g., 50-54 mm B measurement: (top of lens to bottom of lens): 15 mm-100 mm, or any values or ranges of values in between Nose piece measures, the DBL (distance-between-lenses): 1-25 mm width, or any values or ranges of values in between Arm length (temple length): 100-180 mm, or any values or ranges of values in between.

FIGS. 1-9 illustrate multiple embodiments and aspects relating to vision enhancing eyewear. These figures are shown two-dimensionally from the aspect of an observer viewing the apparatus from above. In some embodiments, the apparatus is symmetrical or substantially symmetrical with respect to the wearer's left and right eyes. For example, the same or similar design (e.g., optical elements) may be provided for both eyes to enable bilateral viewing (e.g., viewing of the same image(s)). In other embodiments, only one eye of the apparatus may have enhanced vision capability (e.g., with the other eyepiece being a traditional eyepiece (e.g., lens) for normal vision), or the two eyepieces may have different enhanced vision capabilities.

Turning to FIG. 1, one embodiment of vision enhancing eyewear 100 includes sidearms 102, nose piece 104, and eyepieces 106, which may be integrated into a single housing or frame (e.g., formed from plastic, metal and/or composite material) that is supported by the bridge of a wearer's nose. In some embodiments, this frame, 101, may contain cavities and/or attachments for electronic components, camera(s) optical components, microprocessor(s), service channel(s), wiring, connectors, transmitter(s), receiver(s), battery and electric power sources and charging devices. In some embodiments, the two sidearms 102 may be configured to extend from the body/eyepieces of the frame to beyond the wearer's skin that overlies the upper pinna of the ear and the skin overlying the temporal bone of the skull. In some embodiments, one or both eyepieces 106 may provide a visual image display surface for a wearer.

Apparatus 100 may include one or more optical elements 108 (e.g., condensing optical lens(es)) and/or one or more imaging devices 110 (e.g., sensors or photocells, which may include a silicon chip). In some embodiments, multiple imagers 110 may be provided within apparatus 100, where said imagers 110 may be the same, substantially the same, or different. Alternatively or additionally, apparatus 100 may include one or more image generators (e.g., one or more processors) 112 coupled to imager(s) 110. For example, one or more optical elements 108 may focus incident light either as waves of all wavelengths or photons of varied energy onto an imager 110. Two illustrative cardinal rays (solid lines labeled with arrow showing direction of the ray) are shown from an object (e.g., at a location approaching infinity) brought to a focus on the imager 110. Image generator(s) 112 may automatically execute non-transitory computer program instructions to perform image process(es) that, for example, process signal(s) (e.g., electrical and/or optical signals) from the imager 110 in order to enhance the luminance, contrast and/or other aspects of the signal(s). Image generator(s) 112 may include any suitable hardware, software, or combination thereof for performing the functions disclosed herein.

In some embodiments, imager(s) 110 and/or image generator(s) 112 may include one or more charge-couple devices (CCDs) and/or complementary metal oxide semiconductor (CMOS) imagers. Without intending to be limited, an example of a suitable imager 110 according to some embodiments of the present disclosure includes the Omnivision OV5116N CMOS imager or its equivalent or comparable device(s). Optical elements 108 and 110 and image generator(s) 112 are shown in FIG. 1 as being generally located within or otherwise coupled to nose piece 104 of apparatus 100. However, it will be understood that the presently disclosed embodiments are not necessarily limited to that configuration. Optical elements 108 and 110, and/or image processor(s) 112, can be placed in other location(s) within or coupled to apparatus 100 without departing from the spirit and scope of the described embodiments. For example, in some embodiments, image processor(s) 112 may be located within or adjacent to a sidearm 102, or in a standalone housing that is coupled (e.g., optically coupled, in electrical communication with, and/or wirelessly coupled) to apparatus 100.

In some embodiments, apparatus 100 may include optical system 114 (e.g., projector system, screen, or display device). Optical system 114 may be located in or coupled to a sidearm 102 of the eyewear, although other locations are possible in other embodiments (e.g., within or coupled to nose piece 104). An output of image processor(s) 112 may be coupled to an input of optical system 114 via any suitable optical, electrical and/or electromagnetic/radio/wireless connection(s). For example, such coupling may be made through the eyepiece portion of the frame of apparatus 100. Without intending to be limited, suitable examples of an optical system 114 implemented as a projector system that may be utilized in various embodiments of the present disclosure include one or more light emitting diode (LED) projectors, such as those manufactured by Fraunhofer (www.fraunhofer.de/en/press/research-news/2012/may/mini-projector-for-smartphones.html) and Lemoptix (www.lemoptix.com/technology/_products/mviewmicroprojector) or their equivalent or comparable devices. Without intending to be limited, suitable examples of an optical system 114 implemented as a screen that may be utilized in various embodiments of the present disclosure include one or more screens used in the Carl Zeiss Cinemizer and/or the Vuzix Wrap 920, liquid crystal display(s), and light emitting diode screen(s).

In some embodiments, apparatus 100 may include one or more optical elements for providing the light generated by optical system 114 to the wearer's eye 122. For example, as shown, apparatus 100 may include mirror(s) 116 coupled to nose piece 104, mirror(s) 118 coupled to eyepiece frame 106, and one or more lens(es) 120. In some embodiments, lens 120 is connected to the apparatus at one or more of nose piece 104, eyepiece frame 106 and/or sidearm 102 (e.g., each lens 120 being connected to sidearm 102 and eyepiece frame 106). Light generated by optical system 114 may be reflected by mirror 116 towards mirror 118, which in turn reflects the light through lens(es) 120 to the wearer's eye.

In some embodiments, the apparatus described in accordance with the present disclosure may have a wide dynamic range. Generally, dynamic range reflects the ratio between the maximum and minimum measurable light intensities ("white" and "black") in an image. In some embodiments, the apparatus described herein detects incoming light, by way of example only, in the range of one to one thousand lux (a factor of approximately 1,000 fold, equivalent to approximately 30 db, equivalent to approximately 10 base-2 stops) or any value or range of values in between.

Referring again to FIG. 1, and for example, in some embodiments apparatus 100 may include one or more analog-to-digital converters (ADCs) for one or more pixel(s) of the imager or light sensor (e.g., one ADC per pixel). Such ADC circuitry may be included within, for example, image generator(s) 112. The ADC circuitry may convert incoming light signals to digital signals directly at the point of capture, thereby lowering degradation and cross-talk/ghosting (e.g., caused by overlapping of pixel images). This may allow for improved noise-reduction and dynamic range. Once in digital format, image generator(s) 112 may perform one or more computer processing methods for optimal or improved image reproduction.

In some embodiments, the apparatus described in accordance with some embodiments, may include a contrast enhancement capability. This capability may increase the extent to which adjacent areas of an optical image produced by the apparatus differ in luminance ("brightness") and/or color. In various embodiments, contrast enhancement may be accomplished using physical element(s) (e.g., optical quality lenses such as used in single lens reflex cameras, which may be included within optical elements 108 and/or imager(s) 110), and/or digital elements(s) (e.g., electronic circuitry and/or software such as those used in camcorders, cell phone cameras or digital-only cameras, which may be included within image processor(s) 112). Alternatively or additionally, contrast enhancement may be accomplished by one or more of the following:

1. Selecting (e.g., at the time of manufacture of the apparatus) or changing (e.g., during use by the wearer or automatically) a chemical composition of an optical element (e.g., image screen, mirror, amplifier, beam splitter, or lens) to absorb or better reflect desired wavelengths. This can include reflective (inorganic) metal chemistry, organic (e.g., dye) chemistry, or both.
2. Selecting or changing incoming light filter chemical composition to absorb/transmit selective wavelengths. For example, yellow lenses (e.g., lens(es) 108) may be utilized in some embodiments to increase light/dark contrasts.
3. Selecting or changing chemical composition of finishes on lenses, filters, and/or other optical elements to physically protect optical surfaces from scratching, thereby improving an ability to achieve contrast enhancement.
4. Utilizing self-cleaning surface chemistries or chemical coatings (e.g., siliconization or silanization) that prevent water/salt damage (e.g., from perspiration, rain) or image occlusion that could negatively affect contrast.
5. Selecting polymers and their purit(ies) for optical plastic components to prevent interference with contrast enhancements achieved in other system components.

In some embodiments, the apparatus described herein are intended to enhance detection of local luminance differences on the order of, by way of example only, up to 3 fold, up to 10 fold, up to 25 fold, or any value or range of values in between.

Without intending to be limited, suitable contrast enhancement functionality that may be utilized in various embodiments of the present disclosure is included in the contrast enhancement functionality of the Blackberry Bold cell phone camera, Sony camcorders utilizing TruBlack technology, the Samsung HMX-S10BP camcorder, the Panasonic HC-V100K recorder, the VEM110 Adimec Video contrast enhancement module, or their equivalent or comparable functionalities.

In some embodiments, the apparatus described in accordance with the present disclosure may include a digital zoom capability. For example, the digital zoom capability provided by the apparatus described herein according to some embodiments may include digital zoom up to 2 fold, up to 5 fold, up to 10 fold, up to 15 fold, up to 25 fold, or any value or range of values in between. For example, referring again to FIG. 1, in some embodiments, a digital zoom function may be enabled by computer software in, connected to, or otherwise controlling image generator(s) 112 of apparatus 100. The digital zoom function may decrease (narrow) the apparent angle of view of a digital photographic or video image and thus make the subject appear "closer".

The digital zoom capability may include, for example, cropping an image and then stretching the cropped image to make it larger. In some embodiments, the resulting image can be the same size as the maximum resolution image but, because it has been stretched, no additional detail is visible. In some embodiments, this process can be accomplished electronically, with no adjustment of optics (e.g., lenses). Other image processing techniques may alternatively or additionally be used. For example, simply increasing the size of the pixels, with no downstream image modification or enhancement, might create a jagged or stair-stepped appearance. For this reason, different technique(s) (e.g., technique(s) also implemented by computer software utilized by image generator(s) 112) may be used to "fill in" the missing pixels. For example, apparatus 100 (FIG. 1) may include within image generator(s) 112 computer memory that stores computer-executable instructions (executable by one or more computer processors) for, for example, determining attributes of a pixel's nearest neighboring pixels and calculating an average, and/or taking other factor(s) into account to achieve a digital zoom. For example, without intending to be limited, suitable digital zoom functionality that may be utilized in various embodiments of the present disclosure is included in the digital zoom functionality of current cell phone cameras (e.g., Nokia Lumia cell phone cameras), Panasonic camcorders, Canon EOS digital cameras, Pelco Spectra IV surveillance cameras, Olympus Stereo Zoom microscopes, or their equivalent or comparable functionalities.

In some embodiments, the apparatus disclosed herein may include an optical zoom capability. For example, the optical zoom capability provided by the apparatus described herein according to some embodiments may include optical zoom up to 2 fold, up to 5 fold, up to 10 fold, up to 15 fold, up to 25 fold, or any other value or range of values in between. In some embodiments, the optical zoom capability utilizes the movement of physical lenses to change the focal length of a camera. Optical zoom makes the subject appear closer with maximum image quality. For example, referring again to FIG. 1, in some embodiments an optical zoom function may be provided by one or more lenses 108. For example, without intending to be limited, suitable optical zoom functionality that may be utilized in various embodiments of the present disclosure is included in the optical zoom functionality of current single lens reflex or digital/single lens reflex combination cameras, such as those manufactured by Nikon, Leica, Pentax, Olympus or Minolta; Nikon, Zeiss, Swarovski or Bushnell binoculars; Leupold, Minox, Weaver or Nikon target sighting scopes, or their equivalent or comparable functionalities.

In some embodiments, the apparatus disclosed herein may include a dynamic range scaling capability. For example, in some embodiments, the apparatus disclosed herein may re-scale the dynamic range of input signals (e.g., intensity and/or wavelength) to accommodate visual dynamic range responses, such as those amended by ophthalmic therapies including, by way of example only, gene therapeutics. This can be done by increasing or decreasing the brightness of a given scene (as can be done with current projectors, displays, and/or monitors), and/or attuning projected wavelengths to best match existing/remaining rhodopsins/opsins in the wearer's retina. By way of example, the latter can include converting a color scene to gray-scale, but may also incorporate other light wavelengths as the wearer's spectral response best dictates. By way of further example, a color scene may be converted to predominantly blue (450-495 nm), green (495-570 nm), yellow (570-590 nm), red (620-750 nm) or blended combinations thereof. In some embodiments, the dynamic range scaling capability may be provided as part of image generator(s) 112.

FIG. 2-7B are diagrams of vision enhancing eyewear in accordance with other embodiment of the present disclosure. These embodiments may include the same or similar sidearms 102, nose piece 104, eyepieces 106, optical element(s) 108, imager(s) 110, and/or image generator(s) 112 as described above in connection with FIG. 1. Accordingly, only the additional details in connection with the embodiments of FIGS. 2-7b are described below.

Turning to FIG. 2, apparatus 200 may include optical system 214, which may be similar to optical system 114 (FIG. 1) albeit coupled to an eyepiece 106 instead of a sidearm 102. Apparatus 200 may also include one or more optical element(s) (e.g., one or more lenses), which may be the same as or similar to optical element(s) 120 (FIG. 1). The apparatus of FIG. 2 may transmit an image to the wearer's eye from an optical system (e.g., projector system or screen) located in or coupled to one of the eyepieces of the apparatus. The apparatus may also include one or more optical elements (e.g., a lens or lens system for refraction) to allow the image to be rendered in such a fashion that the human eye, with or without additional optical correction, can focus the light.

Figure 10B:
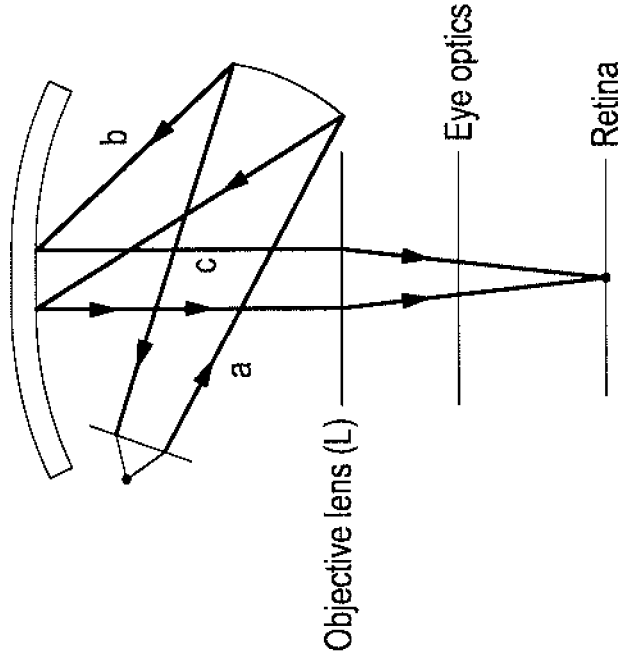
FIG. 10B is an optical ray diagram illustrating how the apparatus described in FIGS. 1 and 5 can be configured to render an imaged according to some embodiments of the present disclosure.
Figure 10A:
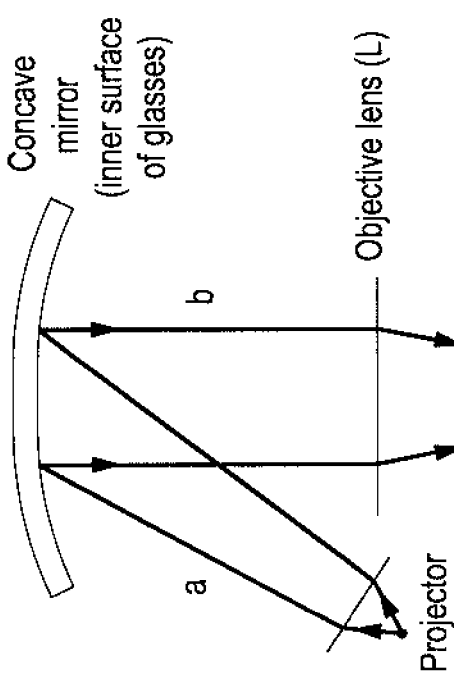
FIG. 10A is an optical ray diagram illustrating how the apparatus described in FIGS. 3, 4, and 6 can be configured to render an image according to some embodiments of the present disclosure.
Figure 11:
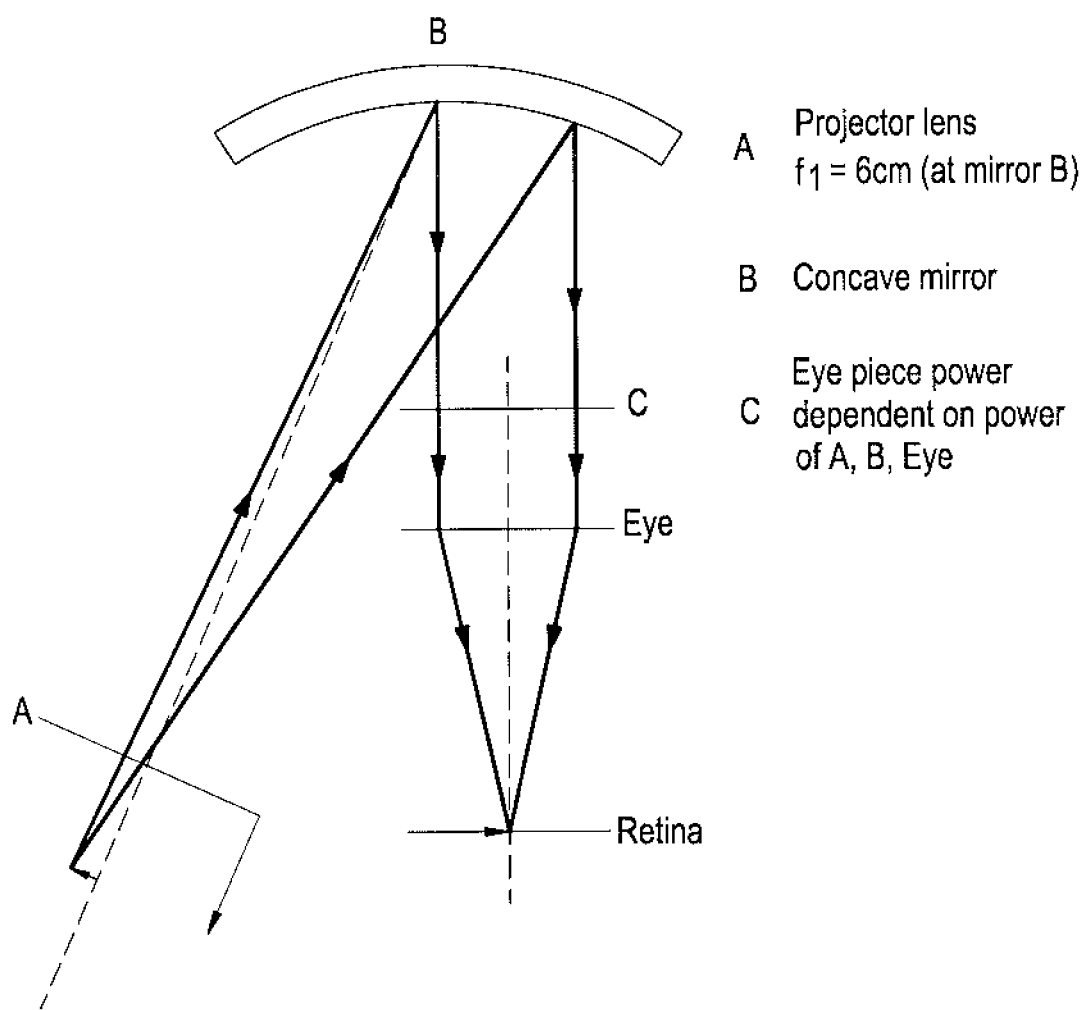
FIG. 11 is an optical ray diagram illustrating how the apparatus described in FIGS. 3, 4, and 6 can be configured to render an image according to some embodiments of the present disclosure.

FIG. 3 is a diagram of a vision enhancing eyewear apparatus in accordance with yet another embodiment of the present disclosure. As shown, the apparatus may transmit an image to the wearer's eye from an optical system (e.g., projector system or screen) located in or coupled to a side arm of the apparatus. Light generated by the optical system may be reflected by one or more optical elements (e.g., a mirror) in or coupled to an eyepiece. The apparatus may also include another one or more optical elements (e.g., lens or lens system for refraction) to allow the image to be rendered in such a fashion that the human eye, with or without additional optical correction, can focus the light. Accordingly, as shown, eyewear apparatus 300 may include optical system 322 (e.g., movie projector), which may be similar to optical system 114 (FIG. 1). Apparatus 300 may also include one or more mirrors 318, which may be the same as or similar to mirror(s) 118 (FIG. 1), and one or more optical element(s) (e.g., one or more lenses), which may be the same as or similar to optical element(s) 120 (FIG. 1). In FIG. 3, light from optical system 322 is reflected by mirror(s) 318 through optical element(s) 120 and into a wearer's eye. FIG. 10a and FIG. 11 are optical ray diagrams illustrating how the apparatus described in FIGS. 3, 4, and 6 can be configured to render an image in such a fashion that the human eye, with or without additional optical correction, can focus the light.

FIG. 4 shows an apparatus that is similar to FIG. 3, except the optical system 424 (same as or similar to optical system 322 in FIG. 3) is coupled to nose piece 104. As shown, the apparatus may transmit an image to the wearer's eye from an optical system (e.g., projector system or screen) located in or coupled to a nose piece of the apparatus. Light generated by the optical system may be reflected by an optical element (e.g., mirror) in or coupled to an eyepiece. The apparatus may also include one or more optical elements (e.g., lens or lens system for refraction) to allow the image to be rendered in such a fashion that the human eye, with or without additional optical correction, can focus the light.

FIG. 5 employs a video projector system 526 to generate the image transmitted to the eye whereas FIG. 1, in some embodiments, uses a screen. As shown, the apparatus may transmit an image to the wearer's eye from an optical system (e.g., projector system or screen) located in or coupled to a side arm of the apparatus. Light generated by the optical system may be reflected by an optical element (e.g., mirror) placed in a nose piece of the apparatus and in turn reflected by another optical element (e.g., mirror) placed in an eyepiece. The apparatus may also include one or more optical elements (e.g., lens or lens system for refraction) to allow the image to be rendered in such a fashion that the human eye, with or without additional optical correction, can focus the light. For example, in some embodiments, FIG. 5 employs a video projector system to generate the image transmitted to the eye, whereas FIG. 1 may use a screen in some embodiments.

FIG. 6 is a diagram showing another embodiment of vision enhancing eyewear according to the present disclosure, in which the housing of the apparatus includes a beam splitter, located in or coupled to the nose piece and frame of the eyewear, that is coupled to an optical system (e.g., two projectors) to provide an image to both of the wearer's eyes. Accordingly, the illustrated apparatus includes beam splitter 630, located in or coupled to the nose piece and frame of the eyewear. Beam splitter 630 is coupled to an optical system (e.g., projector system or screen), which may be the same as or similar to optical system 424 (FIG. 4), to provide an image (e.g., same or similar image) to both of the wearer's eyes.

FIG. 7 is a diagram of vision enhancing eyewear in accordance with still another embodiment of the present disclosure. As shown, the apparatus may transmit an image to the wearer's eye from an optical system (e.g., projector system or screen) located in or coupled to a side arm of the apparatus. Light generated by the optical system may transmitted by optical elements comprising one or more prism(s) and/or mirror(s) and/or lens(es) housed in the arm and/or frame of the apparatus to transmit the image generated by the optical. The apparatus may also include one or more optical elements (e.g., lens or lens system for refraction) to allow the image to be rendered in such a fashion that the human eye, with or without additional optical correction, can focus the light. FIG. 7 may differ from FIGS. 1,3, 4, 5 and 6 because the embodiment may employ prism(s) and/or mirror(s) and/or lens(es) to transmit the image generated by the optical system (e.g., projector system or screen) to the eye, whereas in some instances the other embodiments may not.

FIGS. 8A and 8B are diagrams of vision enhancing eyewear in accordance with yet other embodiments according to the present disclosure, in which incident or ambient light is captured by multiple imaging systems (e.g., multiple cameras). As shown, apparatus 800 may include two or more (typically within the range of two to five)—cameras 108 and 109 coupled to imager(s) and/or image generator(s) similar to or the same as those described in FIG. 1. For example, one or more cameras may be for low light image construction, and other cameras may be for other image construction (e.g., near-vision construction, where near vision refers to a commonly used phrase in ophthalmology describing vision for objects 1 meter or closer to the viewer). In some embodiments, the apparatus may include either a manual (e.g., switch) or automatic adjustment capability that causes the images from the lenses to be transmitted to both eyes. In some embodiments, consistent with human monovision, a distant image focused by one lens and near image focused by the other lens may be simultaneously transmitted to one or both eyes. In FIG. 7*a*, the lenses and imagers 110/111 are shown to be part of (in or coupled to) nose piece 104 of the eyewear. In FIG. 7*b*, the lenses and imagers 110/111 are shown to be placed in any other location in or coupled to the frame 106 of the apparatus (e.g., within the eyepiece portion of the frame).

Figure 9B:
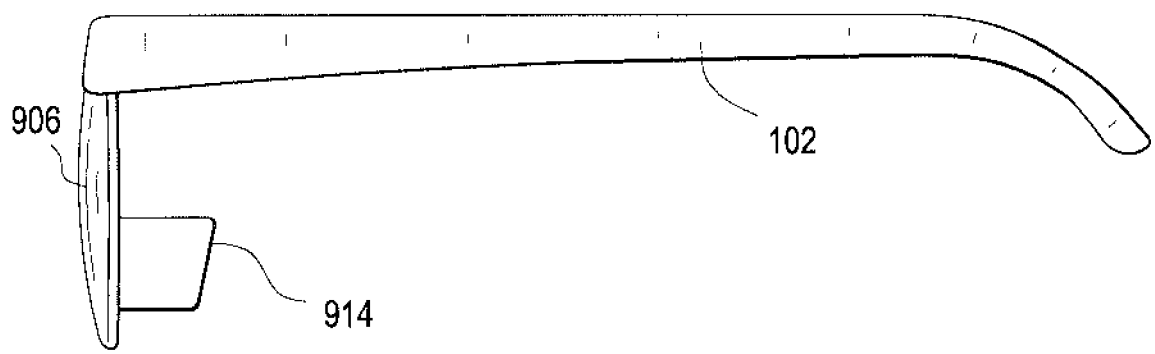
FIG. 9B is a side view of vision enhancing eyewear of the eyewear shown in FIG. 9A.

FIGS. 9A and 9B, are diagrams of vision enhancing eyewear in accordance with yet other embodiment according to the present disclosure. In this embodiment, the wearer is able to view through the eyepieces in the same fashion as through the wearer's ametropic correction, by way of examples, but not limited to myopic, hypermetropic, balance and astigmatic correction, incorporating appropriate corrections for best vision sphere and back vertex distance. In this embodiment, the eyepiece of the apparatus comprises both a clear portion and a viewing screen 914, for projected images. Element 914 viewing screen may comprise any available display system, for example the OLIGHTEK OLED microdisplay (www.OLIGHTEK.com), may transmit an image to the wearer's eye from any of the optical systems and elements previously described in FIGS. 1-7 and the image will be presented to the wearer in some portion of element 914, which may be situated at, for example but not limited to, the infero-nasal part of the eyepiece, an area of the eyepiece often utilized for the bifocal segment of an eyepiece lens. This embodiment may allow the wearer to choose whether to view an image/scene through the eyepiece lens 906, which may incorporate correction for the patient's ametropia or the image presented through the optical apparatus element 914.

FIG. 10A is an optical ray diagram illustrating how the apparatus described in FIGS. 3, 4, and 6 can be configured to render an image according to some embodiments of the present disclosure, in such a fashion that the human eye, with or without additional optical correction, can focus the light. FIG. 10B is an optical ray diagram illustrating how the apparatus described in FIGS. 1 and 5 can be configured to render an image according to some embodiments of the present disclosure, in such a fashion that the human eye, with or without additional optical correction, can focus the light.

FIG. 11 is an optical ray diagram illustrating how the apparatus described in FIGS. 3, 4, and 6 can be configured to render an image according to some embodiments of the present disclosure, in such a fashion that the human eye, with or without additional optical correction, can focus the light.

Figure 12A:
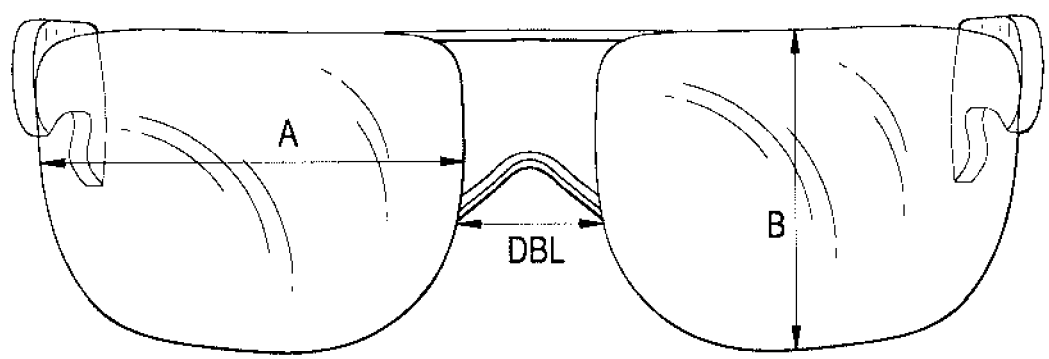
FIG. 12A is a diagram illustrating a front view of vision enhancing eyewear according to some embodiments of the disclosure.
Figure 12B:
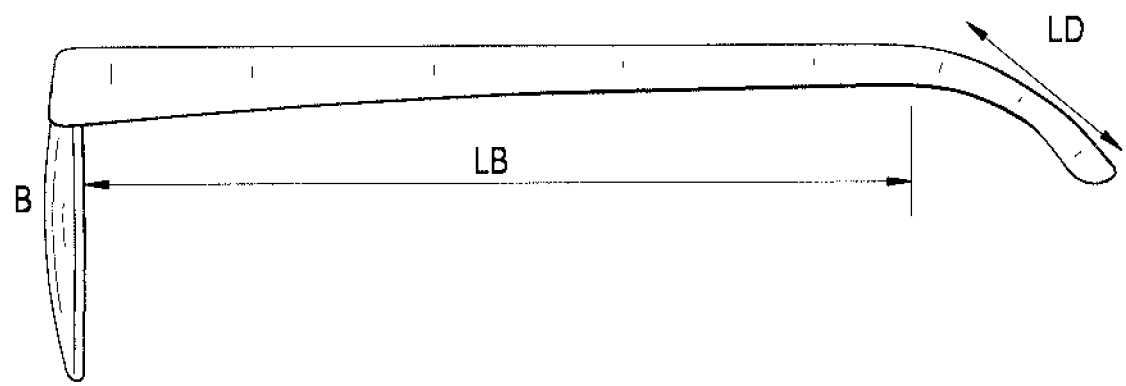
FIG. 12B is a diagram illustrating a side view of vision enhancing eyewear according to some embodiments of the disclosure.

In FIG. 12A, the A, B and DBL measurements are shown. In FIG. 12B, the arm length is shown. In the views, the arm length (as described as the temple length) of the apparatus is calculated as the sum of the horizontal portions (LB) and the vertical portions (LD).

FIGS. 13 and 14 illustrate multiple embodiments and aspects relating to vision enhancing eyewear. These figures are shown two-dimensionally from the aspect of an observer viewing the apparatus from in front.

Figure 13A:
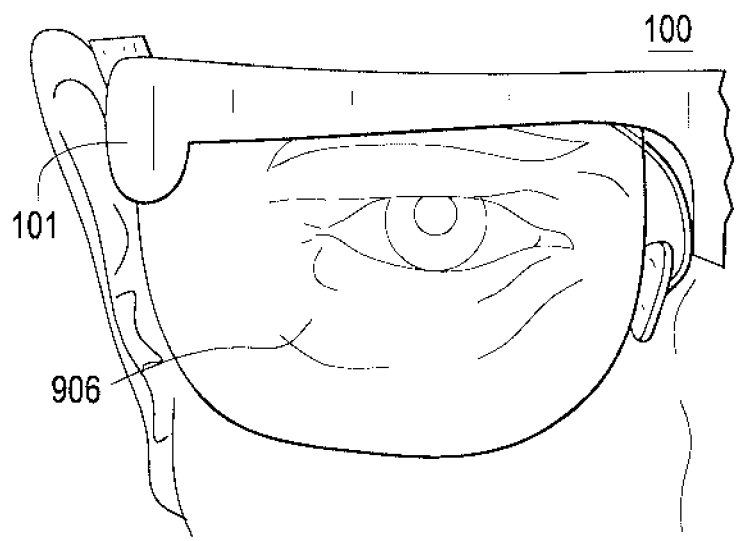
FIG. 13A is a diagram of vision enhancing eyewear according to some embodiments of the present disclosure.

FIG. 13A is a diagram of vision enhancing eyewear in accordance with still another embodiment of the present disclosure. As shown, this embodiment is a modular dual use design of an eyeglass frame depicting use in the capacity of standard frame fitted with prescription lens.

Figure 13B:
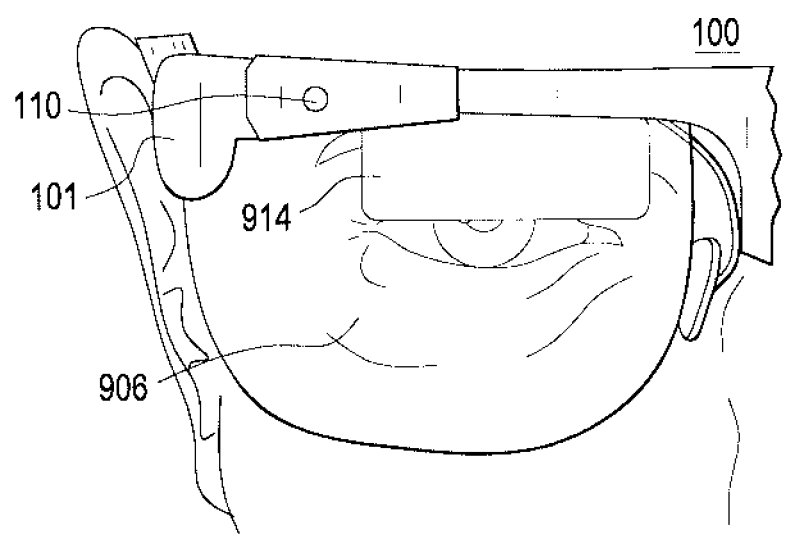
FIG. 13B is a diagram of vision enhancing eyewear according to some embodiments of the present disclosure.

FIG. 13B is a diagram of vision enhancing eyewear in accordance with still another embodiment of the present disclosure. The modular dual use frame is depicted as having been affixed with a multi-chip module composed of a camera, digital image processor, and display. The multi-chip module is affixed to support features and secured to the modular frame. The single prescription lens remains in place for clear viewing.

Figure 13C:
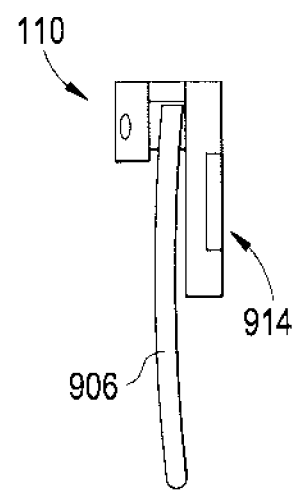
FIG. 13C is a diagram of vision enhancing eyewear according to some embodiments of the present disclosure.

FIG. 13C is a diagram of vision enhancing eyewear in accordance with still another embodiment of the present disclosure. Edge cross sectional view depicting prescription lens affixed to the modular frame and the multi-chip module, containing the camera, processor, and display also affixed to the modular frame. In the direct view display application, the display comprises the upper 33% of the optical field of view, with the remaining 67% unobscured for clear viewing.

Figure 14A:
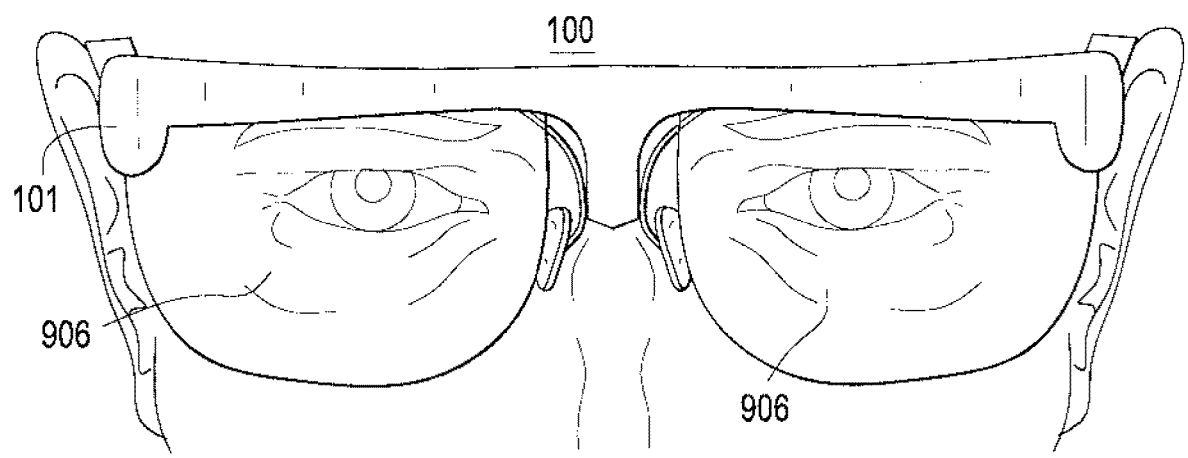
FIG. 14A is a diagram of vision enhancing eyewear according to some embodiments of the present disclosure.
Figure 14B:
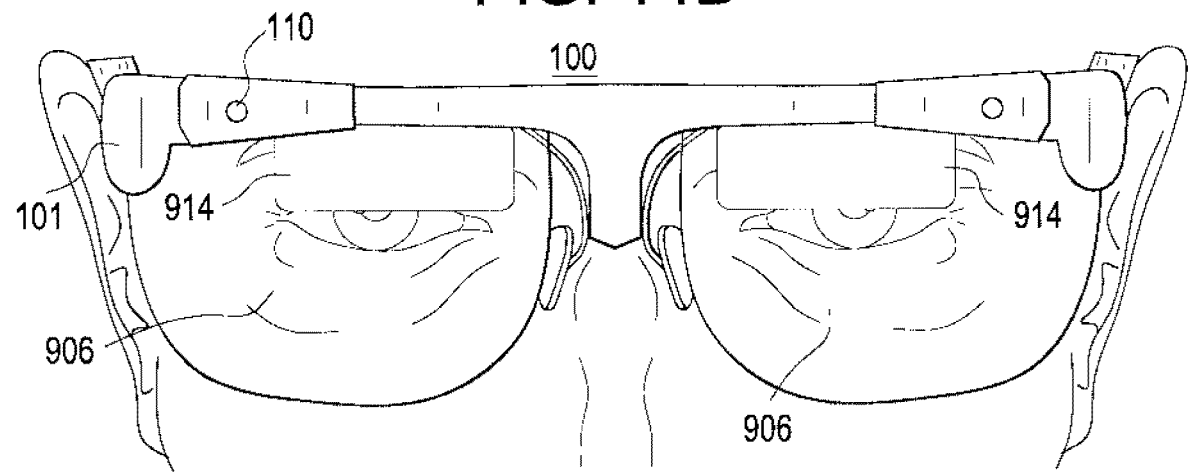
FIG. 14B is a diagram of vision enhancing eyewear according to some embodiments of the present disclosure.
Figure 14C:
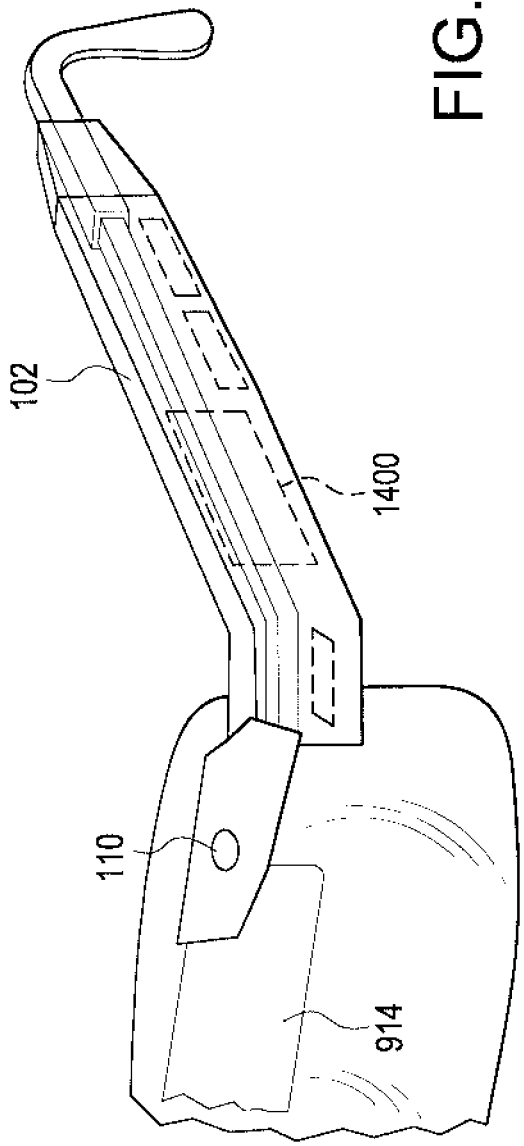
FIG. 14C illustrates a view of the embodiments of FIG. 14B in which the battery system to power the device is housed in the assembled side arm of the modular frame.
Figure 14D:
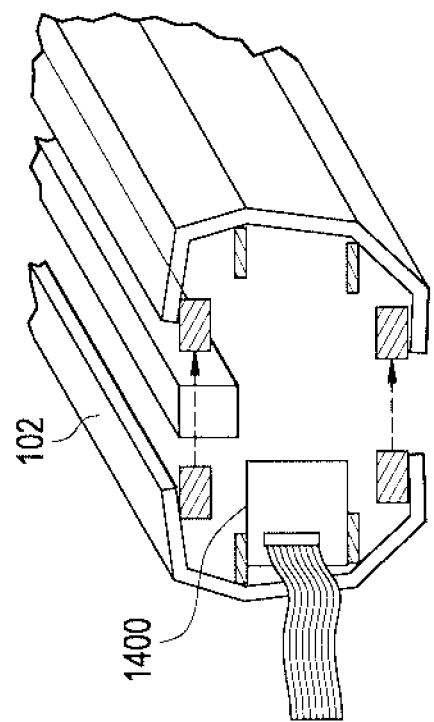
FIG. 14D illustrates an exploded cross section of the side arm construction according to some embodiments.

FIG. 14A is a diagram of vision enhancing eyewear in accordance with still another embodiment of the present disclosure. Depicted is the frontal view of modular dual use frame used in standard prescription optical modality. FIG. 14B is a diagram of vision enhancing eyewear in accordance with still another embodiment of the present disclosure, showing a frontal view of a dual use modular frame with multi-chip module for vision enhancement affixed to the frame. FIG. 14C shows a view of the embodiment of FIG. 14B in which the battery system to power the device is housed in the assembled side arm of the modular frame. FIG. 14D is the exploded cross section of the side arm construction depicting an example of a cavity for battery (1400) and cabling, supports, and interior construction/attachment elements, plus the frame armature to which the assembled pieces of the side arm are attached.

In some embodiments, the apparatus disclosed herein may be configured to detect light in the spectrum of approximately 450 nm-1150 nm (ambient and/or projected light) where light levels in the visual spectrum are low (e.g., below 100 lux, down to 10 lux, down to 1 lux, down to 0.01 lux, down to 0.0001 lux, or any values or ranges of values in between). For example, in some embodiments, one or more light sensors (e.g., photocells) of the apparatus may be configured to detect light incident upon the apparatus from a frontal aspect of the eyeware (e.g., the region immediately in front of the wearer's eyes).

In some embodiments, the apparatus disclosed herein may be capable of detecting low light levels in the visual spectrum (e.g., below 100 lux, down to 10 lux, down to 1 lux, down to 0.01 lux, down to 0.0001 lux, or any values or ranges of values in between) and projecting detected images at light levels within the dynamic range of human photoreceptor cells. For example, in some embodiments, this can be performed through the use of electronic amplifiers (e.g., low-light detecting charge-couple devices (CCDs) imagers and/or complementary metal oxide semiconductor (CMOS) imagers) and/or physical amplifiers (e.g., light guide arrays including, for example, one or more lenses, mirrors, and/or fiber optics that gather, concentrate and project light signals and/or effectively create a larger aperture for light). Such physical amplifier(s) may be located in, for example, the nose piece, eyepiece frame(s), and/or sidearm(s) of the eyewear.

Each of the various illustrative processors, circuits, and/or computer processors described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium or memory. Computer-readable media include both non-transitory computer storage media and communication media including any medium that facilitates transfer of a computer program. A storage medium may be any available media that can be accessed by a computer. By way of example, and not limitation, such computer-readable media can include non-transitory computer-readable media including RAM, ROM, EEPROM, CD-ROM or other optical disk storage, magnetic disk storage or other magnetic storage devices, or any other medium that can be used to carry or store desired program code in the form of instructions or data structures and that can be accessed by a computer (e.g., one or more processors).

Hardware, software, and firmware may be housed in the frame, or sidearms of the eyewear, for example. Alternately hardware, software, and firmware may be housed in an apparatus attached to the eyewear by, for example, a tether (detachable, or hardwired) or in communication with the eyewear by wireless means, including but not limited to Bluetooth, wi-fi, etc. In the case of a detachable tether, the attachments site on the eyewear may be in the form of a USB port (including mini or micro USB), or other standard or suitable computer/electronic connections. The tether may form a loop behind the wearer's head (e.g., in the fashion of Croakies eyewear retainers), providing improved retention of the eyewear. In some embodiments, the tether may be attached to a single point on the eyewear frame, enabling the wearer to clip the hardware to an inconspicuous spot on clothing, slip it into a shirt pocket, etc.

In some embodiments, the apparatus houses and/or is otherwise coupled to the software, hardware, electromagnetic transmission and/or receiving device(s), and/or electronic wiring or wireless capabilities that enable the wearer to access the internet for the purposes of, but not limited to, geographical position location, direction and route finding and other information relating to the external environment and viewing of internet webpages, for example but not limited to, video and/or movie websites such as Netflix, Youtube, Hulu, etc. Such components may be located in and/or coupled to any suitable part of the apparatus, including sidearm(s) 102, nose piece 104, and/or eyepiece frames 106.

In some embodiments, the apparatus houses and/or is otherwise coupled to the software, hardware, electromagnetic transmission and/or receiving device(s), and/or electronic wiring or wireless capabilities that enable the eyewear to act as a computer or computing device monitor or display. Such computers or computing devices include, but are not limited to personal computers, laptops, mobile telephones, smart phones, computer tablets (e.g., iPad), e-books (e.g., Kindle, Nook), computer hard drives, solid-state hard drives, external hard drives, thumb drives, or similar devices. Such components may be located in and/or coupled to any suitable part of the apparatus, including sidearm(s) 102, nose piece 104, and/or eyepiece frames 106.

In some embodiments, the apparatus house(s) and/or is otherwise coupled to the software, hardware, electromagnetic transmission and/or receiving device(s), and/or electronic wiring or wireless capabilities that enable the wearer to interact with and control the aforementioned computer(s) or computing devices by means of a keyboard or similar or other hand and/or finger controlled device or other input devices (including, but not limited to eye-motion control devices, brain wavelength control devices, motion-tracking devices (e.g., motion tracking gloves)) to control and/or modify the content viewed on the screen and/or stored in memory of the eyewear or external hard drive.

It will be appreciated by those skilled in the art that embodiments of the present disclosure can be made to comply with any applicable or potentially applicable regulations or other guidelines or best practices regarding presumed radio frequency transmissions (e.g., concerning transmissions that may interfere with other devices (e.g., hearing aids)). By way of example only, the apparatus described herein can be made to meet to regulations defined in the United States of America Code of Federal Regulations, Title 47 (Telecommunications), Chapter 1 (Federal Communications Commission), Part 15 (Radio Frequency Devices).

Any and all references to publications or other documents, including but not limited to, patents, patent applications, articles, webpages, books, etc., presented in the present application, are herein incorporated by reference in their entirety.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. An eyewear system comprising:
   a frame;
   a plurality of components integrated with the frame, the plurality of components includes a digital camera, a microprocessor, a micro-display, projection optics, and optical lenses;
   at least one of projection optics and optical lenses components are configured to change one or more of optical properties and direction of a received light to thereby generate an optically processed light; and
   at least one of the digital camera, the microprocessor, and the micro-display components are configured to digitally process the optically processed light to thereby generate digitally enhanced light, wherein the digitally enhanced light is directed toward an eye of a user of the eyewear system.

2. The eyewear system according to claim 1, wherein the projection optics include at least one projector element, at least one first reflective surface and at least one second reflective surface, the at least one projector element configured to project at least a portion of an image signal, generated based on an incident light received by the eyewear system, toward the at least one first reflective surface, wherein the at least one first reflective surface is configured to reflect entire projected image signal toward the at least one second reflective surface, wherein the at least one second reflective surface is configured to direct the reflected image signal into the eye of the user.

3. The eyewear system according to claim 2, wherein the at least one projector element includes at least one beamsplitter for directing the image signal toward the at least one first reflective surface.

4. The eyewear system according to claim 2, wherein at least one of the first reflective surface, the second reflective surface, and the at least one projector element include at least one of the following: at least one lens, at least one optical lens, at least one condensing optical lens, at least one lens reflex camera, at least one image screen, at least one mirror, at least one amplifier, a filter, and any combination thereof.

5. The eyewear system according to claim 2, wherein the frame includes at least one sidearm, a nose piece, and at least one eyepiece;
   wherein the digital camera, the microprocessor, the micro-display, and the projection optics are incorporated into at least one of the following: at least one sidearm, a nose piece, at least one eyepiece, and any combination thereof of the eyewear system.

6. The eyewear system according to claim 5, wherein a distance from the at least one sidearm to the nose piece is in the range of 40 mm to 90 mm;
   a distance from a top edge of a lens being secured in the at least one eyepiece to a bottom edge of the lens is in the range of 15 mm to 100 mm;
   a width of the nose piece in the range of 1 mm to 25 mm; and
   a length of the at least one sidearm is in the range of 100 mm and 180 mm.

7. The eyewear system according to claim 2, wherein the frame includes at least one of the following: a battery, one or more electrical connectors, a wireless communication means, and any combination thereof.

8. The eyewear system according to claim 2, wherein a wireless remote control is communicatively coupled with the eyewear system;
   wherein the wireless remote control is configured to control one or more functions of at least one of the following: the digital camera, the microprocessor, the micro-display, and the projection optics and any combination thereof;
   wherein the one or more functions include at least one of the following: an on/off function, one or more display modes, a digital magnification, a contrast adjustment, a low light level signal amplification, a dynamic range alteration of one or both eyes of the user, and any combination thereof.

9. The eyewear system according to claim 2, wherein the eyewear system includes at least one of the following: a digital camera, a microprocessor, a micro-display, projection optics, an optical prescription lenses, and any combination thereof.

10. The eyewear system according to claim 2, wherein an incident light, received by the eyewear system, is a low level light;
    wherein a spectrum of the low level light is in the range of between 0.0001 lux to 1000 lux.

11. The eyewear system according to claim 2, wherein the eyewear system includes at least one image generating device, the at least one image generating device includes at least one of the following: at least one charge-coupled device, at least one complementary metal oxide semiconductor device, at least one solid state imaging device sensitive to light, and any combination thereof.

12. The eyewear system according to claim 2, wherein the digitally enhanced light includes one or more enhanced properties including at least one of the following: a low-light property, a contrast property, a local luminance property, a luminescence property, a digital zoom property, an image size property, an image cropping property, an image stretching property, a resolution property, an optical zoom property, a dynamic range scaling property, a color property, and any combination thereof.

13. The eyewear system according to claim 12, wherein the contrast property is modified using at least one of the following:
- selecting or changing a chemical composition of at least one optical element of the eyewear system;
- selecting or changing a chemical composition of at least one filter of the eyewear system configured to receive an incident light;
- selecting or changing a chemical composition of at least one coating surface of at least one of the at least one optical element and the projection optics;
- utilizing a self-cleaning surface or coating of the at least one optical element to prevent occlusion of an image signal; and
- selecting and utilizing at least one polymer surface for the at least one optical element to prevent interference with the image signal.

14. The eyewear system according to claim 12, wherein the local luminance property provides enhanced detection of local luminance differences in the range of 0 to 25 times.

15. The eyewear system according to claim 12, wherein the digital zoom property provides digital zoom in the range of 0 to 25 times.

16. The eyewear system according to claim 12, wherein the optical zoom property provides optical zoom in the range of 0 to 25 times.

\* \* \* \* \*